United States Patent
Nowak et al.

(10) Patent No.: US 10,584,260 B2
(45) Date of Patent: Mar. 10, 2020

(54) COATINGS, COATING COMPOSITIONS, AND METHODS OF DELAYING ICE FORMATION

(71) Applicant: The Boeing Company, Chicago, IL (US)

(72) Inventors: Andrew P. Nowak, Los Angeles, CA (US); Adam F. Gross, Santa Monica, CA (US); Elena Sherman, Culver City, CA (US); Jill E. Seebergh, Seattle, WA (US); Glenn R. Dalby, Shoreline, WA (US); Douglas H. Berry, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 63 days.

(21) Appl. No.: 15/467,041

(22) Filed: Mar. 23, 2017

(65) Prior Publication Data
US 2017/0253761 A1    Sep. 7, 2017

Related U.S. Application Data

(62) Division of application No. 14/058,470, filed on Oct. 21, 2013, now Pat. No. 9,637,658.
(Continued)

(51) Int. Cl.
*C09D 127/18* (2006.01)
*B05D 5/08* (2006.01)
(Continued)

(52) U.S. Cl.
CPC ............ *C09D 127/18* (2013.01); *B05D 1/02* (2013.01); *B05D 3/007* (2013.01); *B05D 5/08* (2013.01);
(Continued)

(58) Field of Classification Search
CPC ...... C09D 127/18; C09D 5/1681; C09D 7/61; C09D 7/67; C09D 7/68; C09D 7/69;
(Continued)

(56) References Cited

U.S. PATENT DOCUMENTS 5,482,768 A    1/1996    Kawasato et al.
6,110,990 A    8/2000    Nakamura et al.
(Continued)

FOREIGN PATENT DOCUMENTS

CN    1714272 A    12/2005
CN    101094696 A   12/2007
(Continued)

OTHER PUBLICATIONS

Translation of WO 2001/019932 A2, Mar. 2001.*
(Continued)

*Primary Examiner* — Robert S Walters, Jr.
(74) *Attorney, Agent, or Firm* — Parsons Behle & Latimer

(57) ABSTRACT

A coating includes at least one coating layer containing first particles, second particles, and third particles distributed throughout a cross-linked, continuous polymer matrix. An outer surface of the coating layer includes surfaces of at least first particles extending outward from a top periphery of the polymer matrix. The outer surface exhibits a property of delaying ice formation compared to the coating layer without the first particles. A method includes applying a coating composition in one application step. The one-step coating composition contains first particles, second particles, and third particles in a base containing a polymer. A coating composition includes first particles, second particles, and third particles distributed in a matrix precursor.

20 Claims, 5 Drawing Sheets

Related U.S. Application Data

(60) Provisional application No. 61/838,605, filed on Jun. 24, 2013.

(51) Int. Cl.

| | | |
|---|---|---|
| *C09J 175/04* | (2006.01) | |
| *C08L 75/04* | (2006.01) | |
| *C09D 5/16* | (2006.01) | |
| *C09D 7/61* | (2018.01) | |
| *C09D 7/40* | (2018.01) | |
| *C09D 7/65* | (2018.01) | |
| *B05D 1/02* | (2006.01) | |
| *B05D 3/00* | (2006.01) | |
| *B64D 15/00* | (2006.01) | |
| *C08K 3/26* | (2006.01) | |
| *C09D 175/04* | (2006.01) | |
| *C08G 101/00* | (2006.01) | |
| *C08K 3/22* | (2006.01) | |
| *C08K 3/34* | (2006.01) | |
| *C08K 3/36* | (2006.01) | |

(52) U.S. Cl.
CPC ............. *B64D 15/00* (2013.01); *C08K 3/26* (2013.01); *C08L 75/04* (2013.01); *C09D 5/1681* (2013.01); *C09D 7/61* (2018.01); *C09D 7/65* (2018.01); *C09D 7/67* (2018.01); *C09D 7/68* (2018.01); *C09D 7/69* (2018.01); *C09D 175/04* (2013.01); *C09J 175/04* (2013.01); *B05D 5/083* (2013.01); *B05D 2601/00* (2013.01); *B05D 2602/00* (2013.01); *C08G 2101/00* (2013.01); *C08K 3/22* (2013.01); *C08K 3/34* (2013.01); *C08K 3/36* (2013.01); *C08K 2003/265* (2013.01); *C08K 2201/005* (2013.01); *Y10T 428/24355* (2015.01)

(58) Field of Classification Search
CPC ... C09D 7/65; B05D 5/08; B05D 1/02; B05D 3/007; B05D 5/083; B05D 2601/00; B05D 2602/00; C09J 175/04; C08L 75/04; B64D 15/00; C08K 3/26; C08K 2201/005; C08K 3/22; C08K 3/34; C08K 3/36; C08K 2003/265; Y10T 428/24355; C08G 2101/00
See application file for complete search history.

(56) References Cited

U.S. PATENT DOCUMENTS

| | | | |
|---|---|---|---|
| 6,495,624 | B1 | 12/2002 | Brown |
| 7,150,904 | B2 | 12/2006 | D'Urso et al. |
| 7,258,731 | B2 | 8/2007 | D'Urso et al. |
| 7,419,615 | B2 | 9/2008 | Strauss |
| 7,754,279 | B2 | 7/2010 | Simpson et al. |
| 2005/0257558 | A1 | 11/2005 | Yoshioka et al. |
| 2010/0021745 | A1 | 1/2010 | Simpson |
| 2010/0304120 | A1 | 12/2010 | Tokudome et al. |
| 2011/0129646 | A1 | 6/2011 | Grabau |
| 2014/0162022 | A1 | 6/2014 | Nowak et al. |

FOREIGN PATENT DOCUMENTS

| | | |
|---|---|---|
| DE | 19944169 A1 | 3/2001 |
| JP | H445168 A | 2/1992 |
| JP | H724958 A | 1/1995 |
| JP | H10130539 A | 5/1998 |
| JP | H10237431 A | 9/1998 |
| JP | 200017223 A | 1/2000 |
| JP | 200111368 A | 1/2001 |
| JP | 2001259513 A | 9/2001 |
| JP | 200327004 A | 1/2003 |
| JP | 2006143935 A | 6/2006 |
| JP | 20081781 A | 1/2008 |
| JP | 2012117077 A | 6/2012 |
| WO | WO2009158046 | 12/2009 |
| WO | WO2012003004 | 1/2012 |
| WO | WO2012115986 A | 8/2012 |

OTHER PUBLICATIONS

Japan Patent Office; Office Action for JP Patent Application No. 2017-085286 dated Jul. 17, 2018.

European Patent Office; European Examination Report; European Patent Application No. 17188179; dated Jan. 15, 2018.

Pan, Shuaijun, et al; "Superomniphobic Surfaces for Effective Chemical Shielding;" Journal of the American Chemical Society; vol. 135, pp. 578-581, Jan. 1, 2013.

Zhai, Lei, et al: "Stable Superhydrophobic Coatings from Polyelectrolyte Multilayers;" NANO Letters 2004, vol. 4, No. 7, pp. 1349-1353, May 18, 2004.

Boker, Alexander, et al; "Self-assembly of Nanoparticles at Interfaces;" Soft Matter; vol. 3 No. 10; pp. 1205-1320, Oct. 7, 2007.

Wang, Gong G. et al; "Self-Assembled Biomimetic Superhydrophobic CaCO3 Coating Inspired from Fouling Mineralization in Geothermal Water;" Langmuir, V27, pp. 12275-12279, Sep. 15, 2011.

Lai, Yuekun et al; "Markedly Controllable Adhesion of Superhydrophobic Spongelike Nanostructure TiO2 Films;" Langmuir, 24, pp. 867-3873, Mar. 1, 2008.

Conrad, Peter, et al; Ice Nucleation on BaF2 (111); Journal of Chemical Physics 122, pp. 064709-1 to 064709-11, Feb. 2, 2005.

Deng, Xui, et al; "Candle Soot as a Template for a Transparent Robust Superamphiphobic Coating;" Sciencexpress; 9 pages, Dec. 2011.

Cao, Liangliang, et al; "Anti-Icing Superhydrophobic Coatings;" Langmuir Letter, American Chemical Society; 5 pages, Oct. 5, 2009.

European Patent Office; International Search Report and Written Opinion, International Application No. PCT/US2014/034889 dated Jan. 23, 2015.

International Bureau of WIPO; International Preliminary Report on Patentability, International Application No. PCT/US2014/034889 dated Dec. 29, 2015.

U.S. Patent and Trademark Office; Office Action, U.S. Appl. No. 14/058,470 dated Feb. 10, 2016.

U.S. Patent and Trademark Office; Final Office Action, U.S. Appl. No. 14/058,470, dated Aug. 3, 2016.

Japan Patent Office; Office Action; Japanese Patent Application No. 2016-521406; dated Sep. 5, 2017.

The State Intellectual Property Office of China; Office Action; Chinese Patent Application No. 201480028230.7; dated Aug. 18, 2017.

Japanese Patent Office; Office Action issued in Japanese Patent Application No. 2016-521406; dated May 23, 2017.

China National Intellectual Property Administration; Office Action and Search Report; Chinese Patent Application No. 201810101221.6; dated Sep. 20, 2019.

\* cited by examiner

COATINGS, COATING COMPOSITIONS, AND METHODS OF DELAYING ICE FORMATION

CROSS-REFERENCE TO RELATED APPLICATIONS

This application is a divisional application of U.S. patent application Ser. No. 14/058,470, filed Oct. 21, 2013, and entitled "Coatings, Coating Compositions, and Methods of Delaying Ice Formation" which claims the benefit of priority under 35 U.S.C. § 119 to U.S. Provisional App. No. 61/838,605, filed Jun. 24, 2013, entitled "Coatings, Coating Compositions, and Methods of Delaying Ice Formation," both of which are herein incorporated by reference.

TECHNICAL FIELD

Compositions and methods herein pertain to coatings, coating compositions, and methods, including those related to delaying ice formation, such as in aerospace applications.

BACKGROUND

Accumulation of frost, ice, or snow on aircraft changes airflow over aircraft wings, reducing lift and increasing drag. The accumulations also add to the total weight, increasing lift required for takeoff. Accordingly, frost, ice, or snow is normally removed prior to take-off. While in flight, hot engine bleed air, electric blankets, mechanical boots, or combinations thereof may be used to keep ice off exterior surfaces of aircraft. Unmanned Aerial Vehicles (UAV) and rotorcraft cannot operate at certain altitudes due to potential icing of flight surfaces. The listed measures actively consume energy, add weight, and reduce fuel economy.

On the ground, anti-icing and de-icing fluids in the form of hot glycol sprays are employed. While effective, such fluids generate an added expense and may cause gate delays from additional application time. The glycol fluids may generate added expense for remediation. As a result, different options for removing ice from aircraft are desirable.

SUMMARY

A coating includes at least one coating layer containing first particles substantially homogeneously distributed throughout a thickness of a cross-linked, continuous polymer matrix. The thickness of the polymer matrix extends inward from a top periphery of the polymer matrix to a bottom periphery of the polymer matrix. The coating layer also contains second particles substantially homogeneously distributed throughout the thickness of the polymer matrix. The coating layer further contains third particles substantially homogeneously distributed throughout the thickness of the polymer matrix. The second particles have a composition different from the third particles and first particles. An outer surface of the at least one coating layer includes surfaces of at least first particles extending outward from the top periphery of the polymer matrix. The outer surface exhibits a water contact angle greater than 90° and exhibits a property of delaying ice formation compared to the coating layer without the first particles.

A method includes applying a coating composition in one application step. The one-step coating composition contains first particles, second particles, and third particles in a base containing a polymer. The second particles have a composition different from the third particles and first particles and the third particles having a composition different from the first particles. The method includes curing the applied one-step coating composition, forming a cross-linked, continuous polymer matrix, and forming a layer of a cured coating. First particles are substantially homogeneously distributed throughout a thickness of the cross-linked, continuous polymer matrix, the thickness of the polymer matrix extending inward from a top periphery of the polymer matrix to a bottom periphery of the polymer matrix. Second particles are substantially homogeneously distributed throughout the thickness of the polymer matrix. Third particles are substantially homogeneously distributed throughout the thickness of the polymer matrix. Also, the method includes forming an outer surface of the cured layer including at least first particles extending outward from the top periphery of the polymer matrix. The outer surface exhibits a water contact angle greater than 90° and exhibits a property of delaying ice formation compared to the cured layer without the first particles.

A coating composition includes first particles, second particles, and third particles distributed in a matrix precursor. The second particles contain polytetrafluoroethylene and exhibit a particle size range of from about 100 nm to about 500 nm. The first particles are hydrophobic and contain a material selected from the group consisting of silica, carbon, graphite, fluoropolymers, alumina, ceria, zirconia, titania, zinc oxide, and combinations thereof and exhibit a particle size range of less than about 100 nm. The third particles contain a material selected from the group consisting of calcium silicate, calcium carbonate, iron oxides, $Fe_2O_3$, $Fe_3O_4$, FeOOH, and combinations thereof. The third particles also exhibit a particle size range for their largest dimension of greater than about 250 nm and further stabilize dispersion of the second particles compared to the coating composition without the third particles.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some aspects are described below with reference to the following accompanying drawings.

DETAILED DESCRIPTION

The ice reduction measures disclosed herein do not actively consume energy and are not single-use applications of materials that also use energy for each application. Materials described herein do not use external energy during operation, avoid the use of glycol ethers, and provide ice delays over multiple freeze cycles. Consequently, the methods and materials herein may increase aircraft fuel efficiency, reduce use of deicing fluids and their environmental impact, reduce in-flight energy consumption used for ice removal, etc. Although discussed in the context of aviation use, other possible uses are contemplated, such as on wind turbine blades, in non-aerospace transportation, and in communications, including on satellite dishes. The material may be formulated as a coating, such as a paint.

Figure 8:
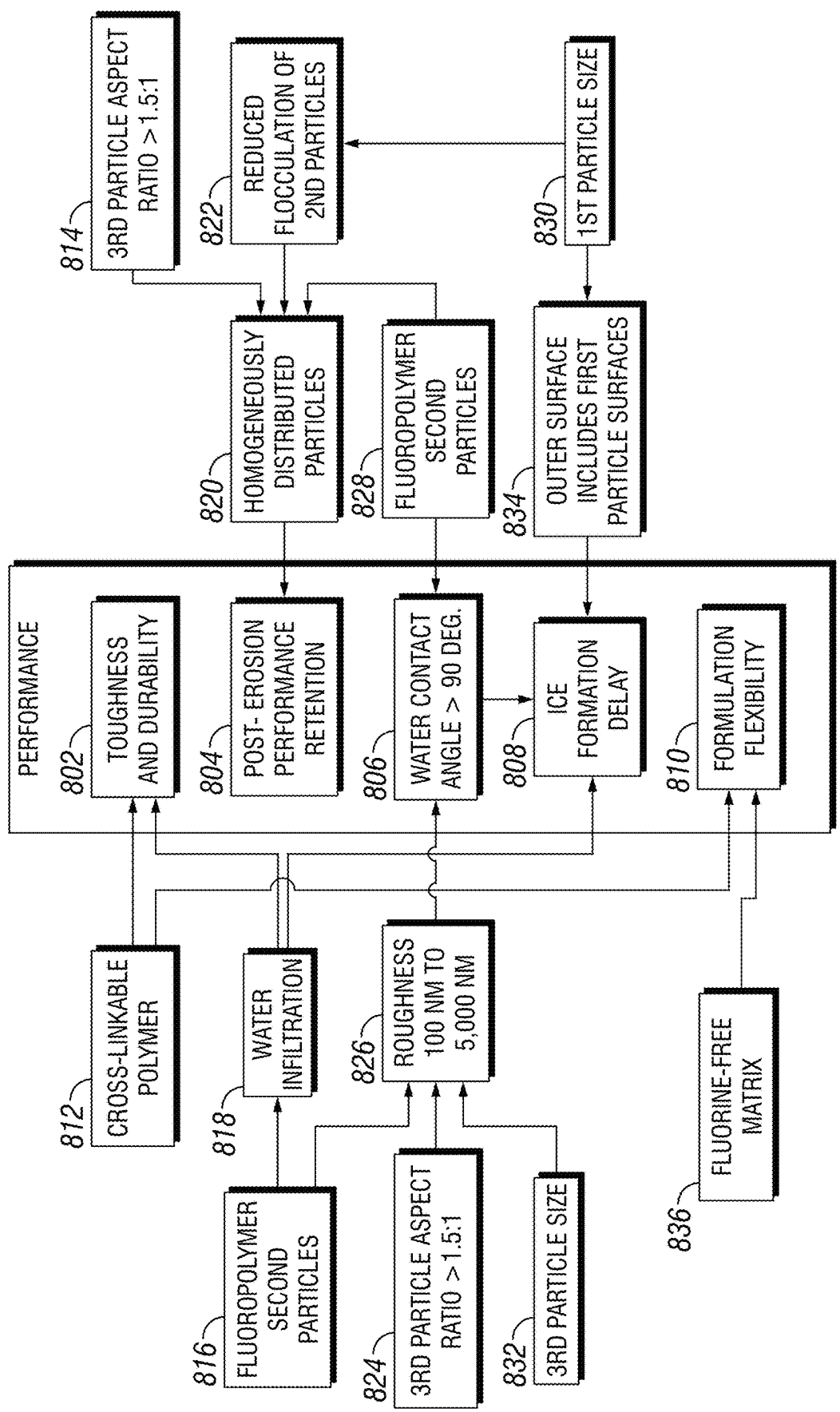
FIG. 8 is a functional block diagram summarizing some of the relationships described in further detail herein.

Materials described herein are thus passive coatings that use no external input of energy to delay ice formation and retain their efficacy after multiple freeze cycles. Some known coatings purport to possess similar benefits. Even so, none provide the herein described level of dewetting and freezing delay combined with toughness and durability. The exterior environment associated with aircraft and other transportation applications (such as, automotive applications) over extended periods may be harsh. Methods and materials herein provide a coating with a cross-linked polymer matrix for toughness and durability. (See FIG. 8, blocks 812 and 802). Also, porous voids and surface roughness of the coating exist on a length scale of hundreds of nanometers to inhibit the wetting of water. (See FIG. 8, blocks 826 and 806). Further, a layer of nanoparticles at the coating surface inhibits nucleation of ice. (See FIG. 8, blocks 834 and 808). Additionally, structural features substantially homogeneously distributed across the coating thickness present similar performance initially and following erosion, defined as removing part of the coating, including abrasion and other forms of wear. (See FIG. 8, blocks 820 and 804).

Known coatings may involve a porous foam network created by extraction of colloidal templates to produce some of the benefits indicated above. As used herein, a "templating material" or "template" refers to a discrete particle that affects the shape of the polymer surrounding it. A templating material, such as solid particles, may be dispersed in a continuous matrix. The matrix acquires a structure around the templating material and the structure remains after extraction of the templating material. Previously, intentional removal of templates was viewed as a prerequisite to creating a sufficient amount of air/water interface to achieve high contact angles and dewetting. The methods and materials herein do not necessarily involve removal of templating material, but still achieve high dewetting performance. Observation herein surprisingly indicated that the surface roughness and voids that drive high contact angle dewetting behavior may be created instead through selection of certain template morphologies, even when the templating material remains in the matrix. (See FIG. 8, blocks 816, 824, 832, and 826). Additionally, it was surprising that a polymer matrix around solid particles formed voids rather than coating the particles fully.

A coating includes at least one coating layer containing first particles substantially homogeneously distributed throughout a thickness of a cross-linked, continuous polymer matrix. The thickness of the polymer matrix extends inward from a top periphery of the polymer matrix to a bottom periphery of the polymer matrix. The coating layer also contains second particles substantially homogeneously distributed throughout the thickness of the polymer matrix. The coating layer further contains third particles substantially homogeneously distributed throughout the thickness of the polymer matrix. The second particles have a composition different from the third particles and first particles. An outer surface of the at least one coating layer includes surfaces of at least first particles extending outward from the top periphery of the polymer matrix. The outer surface exhibits a water contact angle greater than 90° and exhibits a property of delaying ice formation compared to the coating layer without the first particles.

By way of example, the second particles may contain a fluoropolymer. The polymer matrix may be substantially fluorine-free. A "substantially" fluorine-free continuous polymer matrix refers to some trace amounts of fluorine that may be present in the polymer. For example, fluorine might not be a primary component of the polymer chain itself, but nonetheless part of the polymer as a catalyst residue, contaminant, etc. Additionally, the polymer matrix need not incorporate exotic fluorine polymers, such as fluorinated polyhedral oligomeric silsesquioxanes, that are costly and difficult to manufacture. Known polyhedral oligomeric silsesquioxanes are available under the trade name POSS from Hybrid Plastics, Inc. of Hattiesburg, Md. A substantially fluorine-free continuous polymer matrix may still allow the benefits arising from a completely fluorine-free matrix, which include more choice in selection of a polymer, no requirement of polymer fluorination measures, and, thus, simplified coating application procedures. The first particles may also be substantially fluorine-free, which refers to some trace amounts of fluorine that may be present. A substantially fluorine-free first particle may still allow the benefits arising from a completely fluorine-free first particle.

"Substantially" homogeneously distributed particles refers to some deviation from a perfect distribution that may occur and still provide the properties of water contact angle and delays in ice formation. Since the coating could be formed over an underlying substrate, the "outer surface" of the coating layer refers to a surface of the coating layer outward or away from the substrate while the "inner surface" refers to a surface of the coating layer inward or toward the substrate. A homogeneous distribution is a distribution with a uniform structure or composition; for example, a uniform pattern of distributed particles.

Figure 1A:
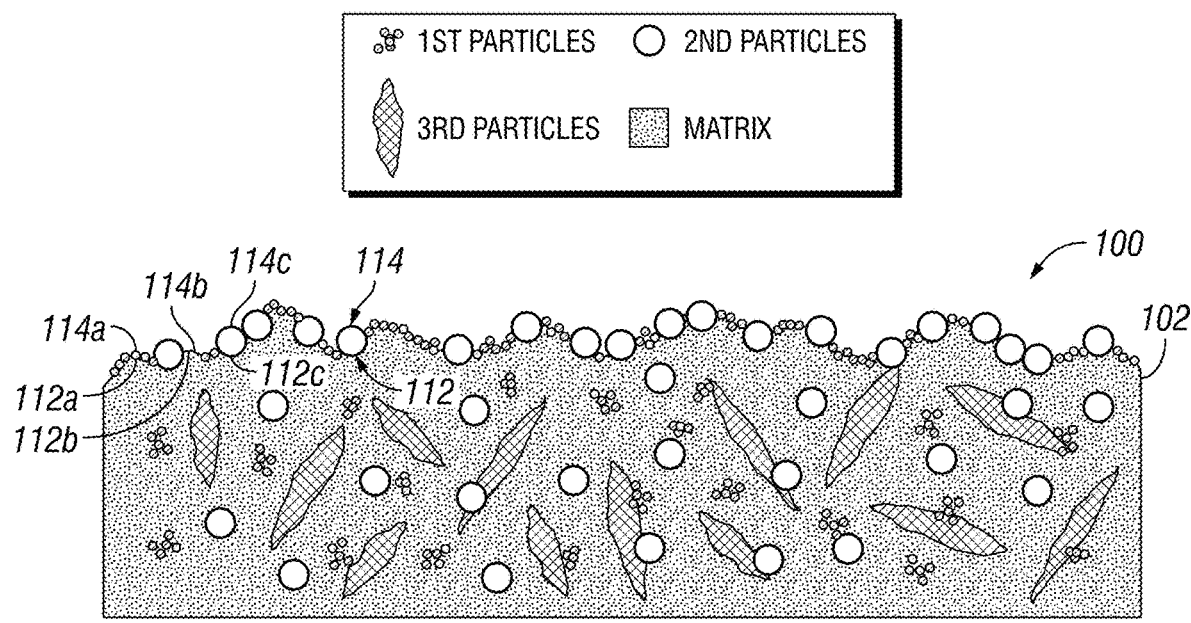
FIGS. 1A and 1B are diagrams of an icephobic coating with particles substantially homogeneously distributed in a matrix.

The uniform pattern may be single particles spaced equally, multiple groupings of particles with the groupings spaced equally, or some other pattern. A substantially homogeneous distribution of each of first particles, second particles, and third particles is shown in FIG. 1A. Notably, all of the first particles are not equally spaced, but they are arranged in a substantially uniform pattern and are thus substantially homogeneously distributed. Since "each" of the three different types of particles is substantially homogeneously distributed, the first particles are individually substantially homogeneously distributed, as are the second and third particles, each type in its own substantially uniform pattern. Given the different size scales and other factors (as discussed further below), some migration together of the first particles with the second particles is shown, but does not upset the individual distribution of each of the three types of particles in their own respective substantially uniform pattern. Indeed, such migration may promote homogeneity (see below).

The coating may be formed from damage-tolerant layers including the cross-linked, polymer matrix with exposed nanoparticles that delay the nucleation of ice. The coating may retain its properties after erosion, such as by abrasion or impacts, and may be sufficiently tough to survive rain erosion from collision with raindrops. The coatings may be formed using a templating process wherein a matrix precursor or liquid base is mixed with templating colloids and nanoparticles, the mixture applied to a surface, and the matrix precursor cured.

Possible polymers include polyurethanes, polyfluorourethanes, epoxies, carbamates, and polysiloxanes that may be cross-linked in the matrix. The coating may be created from aerospace qualified materials that pass durability testing to allow effective use on aircraft. Examples of matrix precursors include DESOTHANE ® HS CA8800/B900 available from PPG Aerospace in Sylmar, Calif. and ECLIPSE ®

(ECL-G-7) available from Akzo Nobel Aerospace Coatings in Waukegan, Ill., both of which are solvent borne gloss polyurethane clear coats. The matrix precursor may contain a polymerizable species and, optionally, a solvent.

Aerospace qualified materials are often resistant to ultraviolet (UV) radiation, as is aliphatic urethane, instead of aromatic urethane, which is not UV resistant. Aerospace qualified materials may be resistant to common materials encountered in aerospace applications, such as hydraulic fluid. While some aerospace qualified materials may be beneficial in an exterior application on aircraft, other aerospace qualified materials may only be qualified for an interior application on aircraft, such as polysiloxane and carbamate polymers. Interior polymers might not be exposed to UV radiation or hydraulic fluid, but still help delay ice accumulation, such as interior condensation in the form of frost on airplane structures. Rapidly melting frost can create nuisance moisture in an airplane cabin. One benefit of at least some of the materials used in the coatings herein includes their compatibility with some known, aerospace qualified matrix precursors so that re-formulation is unnecessary.

The precursor solution may include solvents that do not adversely react in formation of the cross-linked network or dissolve/swell the templating particles. Examples include water, alcohols (such as, methanol, ethanol, isopropanol, t-butanol), acetone, ketones (such as, methyl ethyl ketone, methyl isobutyl ketone, and methyl amyl ketone), toluene, and t-butyl acetate. A colorant and other additives may be included in the precursor solution.

Templating materials may create roughness in the polymer matrix without removal of the materials. (See FIG. 8, blocks 824, 832, and 826). Templating materials may have an inorganic composition, such as, $CaSiO_3$ (calcium silicate), $CaCO_3$ (calcium carbonate), or iron oxides (such as, $Fe_2O_3$, $Fe_3O_4$, FeOOH). Furthermore, acicular $CaCO_3$ particles or needle-shaped Wollastonite ($CaSiO_3$) particles may be used. Wollastonite is a calcium silicate mineral that may contain trace amounts of other elements. Iron oxides, $Fe_2O_3$, $Fe_3O_4$, and FeOOH may also be acicular.

TEFLON® polytetrafluoroethylene (PTFE) may be included as another templating material, such as, mixtures of 100-500 nanometer (nm) TEFLON particles with the templating materials listed above. DUPONT™ TEFLON® ZONYL® MP 1000 nanoparticles with 200-300 nm diameter are suitable. TEFLON 200 nm particles have been used to induce roughness. (See FIG. 8, blocks 816 and 826). Observation indicated that the TEFLON particles reduce water infiltration of a coating as compared to coatings without TEFLON. (See FIG. 8, blocks 816 and 818). The reduction in water infiltration increases durability and increases delay in ice formation compared to coatings without TEFLON. (See FIG. 8, blocks 818 and 802). However, observation further indicated that using only TEFLON, without other listed templating materials, did not yield a substantially uniform distribution of the TEFLON. (See FIG. 8, blocks 828 and 820). $CaCO_3$ or Wollastonite bears the effect of substantially uniformly distributing TEFLON in a coating composition and, thus, the resulting coating. When no $CaCO_3$ or Wollastonite was used, the TEFLON phase separated during jar milling.

Templating materials may undergo a surface treatment to increase hydrophobicity prior to incorporation in a coating composition. Possible surface treatments include alkylsilanes, fluoroalkylsilanes, phosphonic acids, and carboxylic acids, including fatty acids.

Additional particles in the form of hydrophobic nanoparticles may be in the coating composition. Possible nanoparticles include silica, carbon, graphite, fluoropolymers, alumina, ceria, zirconia, titania, and zinc oxide. Like the templating materials, the nanoparticles may undergo a surface treatment to increase hydrophobicity prior to incorporation in the coating composition. Possible surface treatments are alkylsilanes and fluoroalkylsilanes. Hydrophobic silica nanoparticles of about 20 nm in size have been observed to inhibit ice nucleation.

As may be appreciated, a variety of examples are contemplated for implementing the coating introduced above. The third particles may have a composition different from the first particles. Consequently, the first particles may contain $SiO_2$ and the third particles may contain $CaSiO_3$. The fluoropolymer may contain polytetrafluoroethylene. The third particles may exhibit particle sizes greater than the second particles, which may exhibit particle sizes greater than the first particles. The relevant particle sizes may be the values determined according to known standards for testing and measurement of particle sizes appropriate for the size range and composition of the particles.

In more detail, the third particles may exhibit a particle size range for their largest dimension of greater than about 250 nm, such as greater than about 500 nm, including greater than about 500 nm to about 20,000 nm. The third particles may have an anisotropic particle size so that the largest dimension is from about 2,000 nm to about 10,000 nm, such as from about 3,000 nm to about 6,000 nm. The smallest dimension may be from about 100 nm to about 2,000 nm, such as from about 400 nm to about 600 nm. Accordingly, third particles may exhibit aspect ratios of at least about 1.5:1, such as from about 1.5:1 to about 10:1.

The second particles may exhibit a particle size range of from about 100 nm to about 10,000 nm, such as from about 100 nm to about 500 nm, including from about 200 nm to about 300 nm. The first particles may exhibit a particle size range of less than about 100 nm, such as less than about 50 nm, including from about 5 nm to about 50 nm, for example, from about 15 nm to about 30 nm. In the coating, the coating layer may exhibit a mass ratio of 1st:2nd:3rd, wherein "1st," "2nd," and "3rd" are the respective proportions of first, second, and third particles, 2nd being greater than both 1st and 3rd.

The polymer in the coating need not be hydrophobic and/or icephobic for the coating to exhibit beneficial properties described herein. As a result, the polymer matrix may exhibit a water contact angle less than 90°. For the coating to nonetheless delay ice formation, the outer surface of the coating layer may include surfaces of at least first particles in addition to surfaces of polymer matrix. The outer surface may further include surfaces of second particles extending outward from the top periphery of the polymer matrix and, perhaps, even third particles.

Exposure of the particles at the outer surface may thus provide the desired properties without a hydrophobic and/or icephobic polymer matrix. Less restriction on the properties of the polymer matrix allows greater flexibility in formulation. (See FIG. 8, blocks 836, 812, and 810). Consequently, the coating does not rely on a fluorinated polymer matrix to delay ice formation and the matrix may be substantially fluorine free, affording the benefits of a fluorine-free matrix described above. Because first particles, second particles, and third particles are each substantially homogeneously distributed in the polymer matrix, erosion, such as abrasion or other wear, of the outer surface to form another outer surface may preserve similar properties. The removed polymer matrix and particles merely reveal underlying particles that function similarly.

The coating may include a plurality of such coating layers, each with its own outer surface. The outer surface of underlying coating layers is not necessarily exposed since it may be covered by the inner surface of an overlying coating layer. The polymer matrix may include polyurethane or the polymer matrix may meet qualification requirements in accordance with an aerospace specification or both. The polymer matrix may meet qualification requirements in accordance with specifications for other applications, such as use on wind turbine blades.

The second particles may exhibit the property of reducing water infiltration compared to an equal mass of the first particles, third particles, or a combination thereof. Water infiltration may be controlled by reducing porosity. The coating layer may exhibit a cured porosity of at most 70 volume percent (vol %), such as at most 25 vol %, including from about 5 vol % to 25 vol %. Allowing at least some porosity may provide distributed void interfaces, such as air-polymer interfaces, and promote nanoparticle distribution, as discussed further below. Interfaces between polymer and particles much larger than nanoparticles may also promote nanoparticle distribution, as discussed further below. Despite a porosity value of at most 25 vol %, the outer surface may exhibit a surface roughness on a length scale of from about 100 nm to about 5,000 nm (200 microinches), such as from about 100 nm to about 4,000 nm, as induced by the templating material.

Figure 1B:
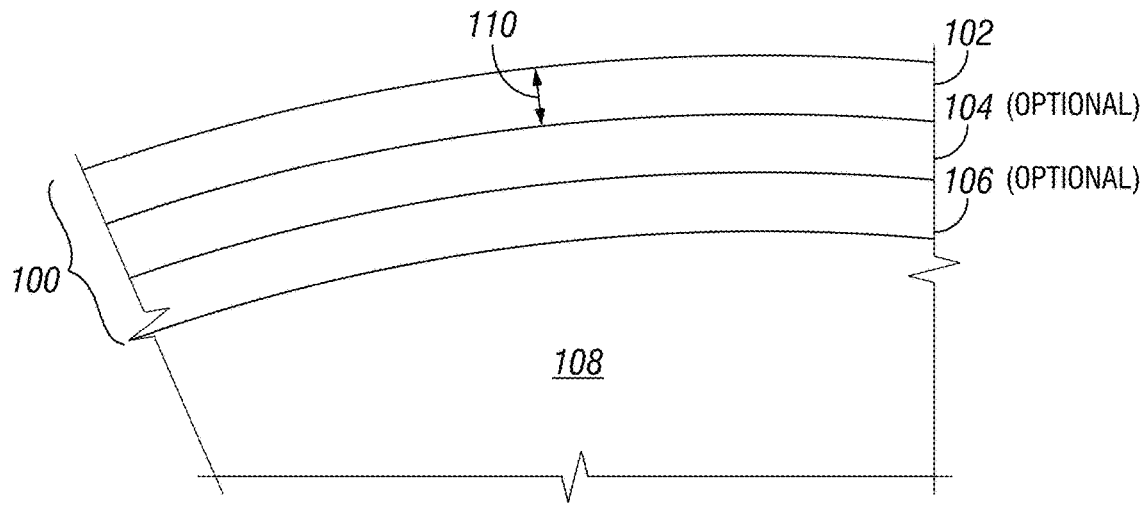

FIG. 1A is a diagram of a portion of a layer 102 of a coating 100. While an outer surface 114 of layer 102 is apparent, FIG. 1A is not intended to depict an inner surface of layer 102 or underlying coating layers. Optional, underlying layers 104 and 106 of coating 100 are shown in FIG. 1B formed over substrate 108 and may have the same composition and exhibit the same structural features as layer 102. Layer 102 contains first particles substantially homogeneously distributed throughout a thickness 110 of the matrix. The matrix is shown in FIG. 1A as a continuous matrix, which may be substantially fluorine-free and cross-linked. Thickness 110 of the matrix extends inward from a top periphery 112 of the matrix to a bottom periphery (not shown in detail in FIG. 1A) of the matrix. Layer 102 also contains second particles substantially homogeneously distributed throughout thickness 110 of the matrix. Layer 102 further contains third particles substantially homogeneously distributed throughout thickness 110 of the matrix.

It will be appreciated that the first, second, and third particles are not drawn to scale, but are intended to graphically depict approximate shapes and the feature that the third particles exhibit particle sizes greater than the second particles, which exhibit particle sizes greater than the first particles. The second particles may contain a fluoropolymer and may have a composition different from the third particles and the first particles. Additionally, the third particles may have a composition different from the first particles. Compositional differences are represented in FIG. 1A with different hatching patterns for the matrix and the first, second, and third particles. As opposed to a known continuous layer of fluoropolymer in a coating, as in the prior art, the fluoropolymer herein may exist in discrete particles throughout the matrix, providing additional benefits beyond the mere hydrophobicity of fluoropolymer materials.

Layer 102 includes an outer surface 114 with surfaces of at least first particles extending outward from top periphery 112 of the matrix. In FIG. 1A, outer surface 114 includes surfaces of first particles 114a, matrix 114b, and second particles 114c. Surfaces of second particles 114c of outer surface 114 extend outward from top periphery 112c of the matrix. Surfaces of first particles 114a of outer surface 114 extend outward from top periphery 112a of the matrix. Surfaces of matrix 114b of outer surface 114 coincide with top periphery 112b of the matrix.

By virtue of the roughness of outer surface 114 and the presence of hydrophobic first particles and second particles, outer surface 114 may exhibit a water contact angle greater than 90 degrees. (See FIG. 8, blocks 828 and 806). Outer surface 114 may include surfaces of the first particles exhibiting a particle size range of less than about 100 nm, such as from about 5 nm to about 50 nm. As a result, outer surface 114 may exhibit a property of delaying ice formation compared to layer 102 without the first particles. Such properties may be afforded even in the circumstance where the matrix exhibits a water contact angle less than 90 degrees, including at surfaces of matrix 114b of outer surface 114.

The polarity (or hydrophobicity) of particles may also contribute to delaying ice formation. Less polar (more hydrophobic) particles may delay ice formation since ice is polar and formation on a non-polar or less polar surface is energetically less favorable. (See, Conrad, P.; Ewing, G. E.; Karlinsey, R. L.; Sadtchenko, V. J. Chem. Phys. 2005, 122, 064709). The tendency of one surface to allow ice formation more readily compared to another surface has been attributed in some cases to a significantly larger contact angle for the hydrophobic surface. (See FIG. 8, blocks 806 and 808).

Layer 102 may exhibit a cured porosity of at most 70 vol %, such as at most 25 vol %. Porosity may be present as voids (not shown) in the matrix. The first particles may form a Pickering emulsion with voids. Such an emulsion may include two phases having an interface therebetween, for example, an air-liquid interface, a hydrophilic-hydrophobic interface, etc. Solid particles, which adsorb onto the phase interface, may stabilize the emulsion. When oil and water are mixed, small droplets of oil may form throughout the water initially, but later recombine to reduce the energy of the mixture. However, solid particles added to the mixture may bind to the surface of the droplet's oil/water interface and stabilize the emulsion by making the combination of oil droplets less energetically favorable. Particle size, shape, and hydrophobicity may further affect stability. In this sense, the particles behave as a "surfactant."

Voids dispersed throughout the matrix of layer 102 provide an air-liquid interface to which the first particles may adsorb. Accordingly, uniformly distributed voids may assist in uniformly distributing first particles. While porosity resulting from voids in the matrix may assist in distributing first particles, too much porosity reduces strength and increases water penetration of coating 100. For such reason, some porosity may be desirable, such as, from at least 5 vol % to at most 25 vol %.

When the matrix is less hydrophobic than second particles and/or third particles, or perhaps hydrophilic with a water contact angle less than 90°, another interface exists in layer 102. First particles may then adsorb onto the interface between a less hydrophobic matrix and a more hydrophobic particle that is larger than first particles. Since the coating described herein includes use of a hydrophilic polymer matrix and second and third particles may be treated to increase hydrophobicity, hydrophilic-hydrophobic interfaces may exist which are dispersed throughout the matrix. The dispersed interfaces further assist in uniformly distributing first particles. In the case of TEFLON second particles in a polyurethane matrix, the surface polarity of second particles does not match well with the polyurethane, so first particles, such as silica, may coat the second particles as a surfactant to reduce flocculation of the second particles, such as by forming a Pickering emulsion. (See FIG. 8, blocks 830, 822, and 820).

Top periphery 112 of the matrix may also present an air-liquid interface to which first particles may migrate. When a coating composition is applied and the air-liquid interface at top periphery 112 is created, first particles may act as a surfactant, adsorbing to the interface. Such behavior provides first particles extending outward from top periphery 112 of the matrix. First particles are both adsorbed to the cured matrix and exposed as part of outer surface 114 of layer 102. (See FIG. 8, blocks 830 and 834). Second particles exhibiting a hydrophobicity difference from the matrix and a particle size range from about 100 nm to about 500 nm may also migrate to top periphery 112. Second particles may then also be adsorbed to the cured matrix and extend outward from top periphery 112 to be exposed as part of outer surface 114. (See FIG. 8, blocks 828 and 806).

In addition to first particles stabilizing second particles in the matrix as an emulsion, observation indicated that third particles also contributed to substantially homogeneously distributing second particles in the matrix. Second particles may be too large to form a Pickering emulsion with the much larger third particles. Also, polytetrafluoroethylene second particles likely will not preferentially go into either a water or oil phase. That is, while they are hydrophobic, they might also be lipophobic and/or oleophobic. Without the presence of third particles, second particles were observed to separate from the matrix liquid phase during mixing by jar milling. Without being limited to any particular theory, suitable third particles may act as a flow reducer and thickener in a coating composition. The high aspect ratio of needle-shaped, acicular, cylindrical, or similar particles may produce a viscosity increase and screen migration of particles in the liquid phase of a coating composition. Accordingly, third particles might assist in reducing agglomeration of second particles and in keeping them dispersed. (See FIG. 8, blocks 814 and 820).

Respective substantially homogeneous distribution of first, second, and third particles throughout the matrix may provide the benefit of preserving hydrophobic and icephobic properties of outer surface 114. When first particles and second particles are removed from outer surface 114, the properties may remain at least to some extent. Erosion of layer 102 may remove portions of outer surface 114, including first particles and second particles, exposing underlying matrix and other first particles and second particles. Removal of particles and the matrix tends to occur at the weakest points in layer 102, namely at matrix-void interfaces and matrix-particle interfaces. As a result, since first particles may be adsorbed at void interfaces, erosion tends to expose particles underlying outer surface 114 that migrated to the air-liquid interface of voids. Particles that migrated to the hydrophobic-hydrophilic interfaces around second and/or third particles might similarly be exposed by erosion. In this manner, even though the matrix may be hydrophilic, another hydrophobic outer surface may be formed after erosion. Such another outer surface may also exhibit the property of delaying ice formation.

A method includes applying a coating composition in one application step. The one-step coating composition contains first particles, second particles, and third particles in a base containing a polymer. The second particles have a composition different from the third particles and first particles and the third particles have a composition different from the first particles. The method includes curing the applied one-step coating composition, forming a cross-linked, continuous polymer matrix, and forming a layer of a cured coating.

First particles are substantially homogeneously distributed throughout a thickness of the cross-linked, continuous polymer matrix, the thickness of the polymer matrix extending inward from a top periphery of the polymer matrix to a bottom periphery of the polymer matrix. Second particles are substantially homogeneously distributed throughout the thickness of the polymer matrix. Third particles are substantially homogeneously distributed throughout the thickness of the polymer matrix. Also, the method includes forming an outer surface of the cured layer including at least first particles extending outward from the top periphery of the polymer matrix. The outer surface exhibits a water contact angle greater than 90° and exhibits a property of delaying ice formation compared to the cured layer without the first particles.

In addition to the outer surface properties of a cured layer formed from the coating compositions described herein, one-step application is another benefit. Some prior art forms multiple layers of differing composition to complete a coating or treat a coating after application to imbue certain properties. In contrast, materials of coating compositions herein inherently possess desired properties in their as-applied state without further layers, treatment, etc. Curing merely solidifies the structural features.

By way of example, the cured layer may exhibit a porosity of at most 25 vol %. The cured layer may be formed over an exterior surface of an aircraft. The method may further include forming a plurality of the layers of the cured coating by repeating the application of the coating composition over the exterior surface and curing the repeatedly applied one-step coating composition. The second particles may contain a fluoropolymer and the polymer matrix may be substantially fluorine-free. The particles may exhibit the size ranges described elsewhere herein. The outer surface may exhibit the surface roughness described elsewhere herein.

Applying the coating composition may include spray applying using known techniques. Known paint on methods or appliques may be used instead, though a benefit exists in compatibility with known spray equipment for efficient coverage of large areas. Curing the coating composition may include completing the cross-linking or completing the cross-linking sufficiently for the intended use of the coating. The polymer matrix may exhibit a water contact angle less than 90° and the outer surface of the cured layer may further comprise polymer matrix. The second particles may be selected to exhibit the property of reducing water infiltration compared to an equal mass of the first particles, third particles, or a combination thereof. Eroding the outer surface forms another outer surface, the other outer surface exhibiting a water contact angle greater than 90° and a property of delaying ice formation compared to the cured layer without the first particles.

A coating composition includes first particles, second particles, and third particles distributed in a matrix precursor containing a polymerizable species and, optionally, a solvent. The second particles contain polytetrafluoroethylene and exhibit a particle size range of from about 100 nm to about 500 nm. The first particles are hydrophobic and contain a material selected from the group consisting of silica, carbon, graphite, fluoropolymers, alumina, ceria, zirconia, titania, zinc oxide, and combinations thereof and exhibit a particle size range of less than about 100 nm. The third particles contain a material selected from the group consisting of calcium silicate, calcium carbonate, iron oxides, $Fe_2O_3$, $Fe_3O_4$, FeOOH, and combinations thereof. The third particles also exhibit a particle size range for their largest dimension of greater than about 250 nm and further stabilize dispersion of the second particles compared to the coating composition without the third particles.

By way of example, the first particles may reduce flocculation of the second particles and stabilize dispersion of the second particles. As one possibility, the first particles may form a Pickering emulsion with the second particles. The matrix precursor may be substantially fluorine-free. The first particles may contain $SiO_2$ and exhibit a particle size range of from about 5 nm to about 50 nm. The third particles may contain $CaSiO_3$ and exhibit a particle size range for their largest dimension of greater than about 500 nm to about 20,000 nm. The matrix precursor may meet qualification requirements in accordance with an aerospace specification. In more detail, the coating composition may exhibit a mass ratio of B:1st:2nd:3rd, wherein "B" is the proportion of solids in the matrix precursor and "1st," "2nd," and "3rd" are the respective proportions of first, second, and third particles, B being less than the sum of 1st, 2nd, and 3rd and 2nd being greater than both 1st and 3rd.

EXAMPLES

Experimental.

A variety of sample coatings was prepared and is summarized below in Table 1. Mass ratios of B:1st:2nd:3rd indicated B=base, 1st=silica, 2nd=TEFLON, and 3rd=$CaCO_3$ or $CaSiO_3$. For samples using PPG DESOTHANE CA8800/6900 with a 1:1:4:2 mass ratio, such as sample 130, they were made as follows: Silica (2 grams (2 g)), TEFLON (8 g), $CaCO_3$ or $CaSiO_3$ (4 g), and PPG CA8800F Thinner (23 g) were added to a 50 milliliter (mL) centrifuge tube then briefly vortexed to homogenize the mixture. DESOTHANE CA8800/6900 Base (1.36 g) and PPG CA8800Z Activator (0.76 g), which contain a total of 2 g of solids, were added to the suspension of filler (particles) and briefly vortexed. Samples with other mass ratios and/or fillers, such as samples 162, 163, 167, and 168, were prepared similarly.

Also, for samples using Akzo Nobel ECL-G-7 with 1:1:4:2 mass ratio, such as samples 126 and 137, they were made as follows: Silica (2 g), TEFLON (8 g), $CaCO_3$ or $CaSiO_3$ (4 g), and Akzo Nobel TR-109 Thinner (22 g) were added to a 50 mL centrifuge tube then briefly vortexed to homogenize the mixture. ECL-G-7 Base (1.92 g) and Akzo Nobel PC-233 Activator (1.15 g), which contain a total of 2 g of solids, were added to filler suspension and briefly vortexed.

The mixture was then weighed and mixed for 15 minutes with a planetary centrifugal mixer available from THINKY USA, Inc. in Laguna Hills, Calif. The mixture was weighed again and solvent was added to restore the original mass.

Coupons painted with an aerospace white topcoat (PPG DESOTHANE CA8000 BAC70846 white) as control specimens were prepared by spraying with Sur-Prep AP-1 adhesion promoter manufactured by AndPak, Inc. in Morgan Hill, Calif. and allowed to dry for 30 minutes. Then the paint mixture was placed in a DeVilbiss (in Glendale Heights, Ill.) gravity spray gun and applied using an air pressure of 10 pounds per inch$^2$ (psi) on the coupons. The painted coupons were left in a fume hood for at least 10 hours and then either cured in an 80° C. oven for 4 hours or a 50° C. oven for 16 hours.

Materials.

Materials used to create coatings may be further described as follows. PPG DESOTHANE CA8800/6900 is a two-part polyurethane aerospace clear-coat paint. Akzo Nobel ECLIPSE ECL-G-7 is a two-part polyurethane aerospace clear-coat paint.

Hexamethyldisilazane (HMDZ) treated silica nanoparticles are 22 nm in diameter and were used to inhibit icing. The particle diameter is similar to the size of ice nuclei and is believed to disrupt them. Particles of about this size are theorized to reduce the nucleation rate of ice based on both their hydrophobic character and the high curvature forced on the ice nuclei during heterogeneous nucleation on the particle surface. (See, Conrad, P.; Ewing, G. E.; Karlinsey, R. L.; Sadtchenko, V. J. Chem. Phys. 2005, 122, 064709). Heterogeneous nucleation refers to nucleation on a surface other than ice, while homogeneous nucleation refers to nucleation on ice already formed. The HMDZ treated silica nanoparticles were easily incorporated into the DESOTHANE clear coat system. Polymer solids-to-silica mass ratios of 1:1, 2:1, and 4:2 were used in experiments because these ratios were found to increase inhibition of ice nucleation without coating embrittlement in preliminary testing.

BYK LP-X22325 (formerly LP-X21261) is a hydrophobic colloidal silica with an average particle size of 20 nm.

SUPER-PFLEX® 100 $CaCO_3$ available from Specialty Minerals in Bethlehem, Pa. is a star shaped, stearate modified (1 weight percent (wt %)), hydrophobic filler that creates surface roughness through porosity. Coatings based on this material were favored in preliminary testing but were supplanted by more durable coatings containing Wollastonite. The SUPER-PFLEX material was utilized in one of the preferred coatings.

SUPER-PFLEX 200 $CaCO_3$ is a star shaped, stearate modified (2 wt %), hydrophobic filler that creates surface roughness through porosity. This coating has a stearate density twice as high as SUPER-PFLEX 100. Coatings based on this material were not superior to SUPER-PFLEX 100 based coatings and were not preferred.

Wollastonite $CaSiO_3$ are needle-shaped particles less than 10 micrometer (μm) in length available from NYCO Minerals Inc. in Willsboro, N.Y. in three variants that have the same size and aspect ratio. $CaSiO_3$ is attractive because of the variety of morphologies, surface treatments, and robustness against degradation from exposure to acids, bases, or solvents. Wollastonite 1250WC (NYCO Minerals M1250 Wollastocoat 20804) is surface modified with hydrophobic surface groups to control polarity and amine groups that chemically bond with isocyanates used in polyurethanes. 1250WC material was in the highest performing coatings. Wollastonite 1250AS (NYCO Minerals M1250 AS Wollastocoat) is surface modified with amine groups that chemically bond with isocyanates used in polyurethanes. Coatings containing this filler had slightly shorter ice nucleation delays than coatings containing 1250WC, probably because of their more hydrophilic nature. Wollastonite 1250 is particles without any surface modification. These particles do not resist water infiltration after multiple freezing cycles and were not used in preferred coatings.

NYCO Minerals Inc. Wollastonite Aspect 3000 WC20804 is a $CaSiO_3$ particulate filler with a higher aspect ratio than Wollastonite 1250WC. It has an average particle size of 7 microns and a surface area of 2.2 meter²/g. This material is coated with amine and hydrophobic chemical groups.

DUPONT™ TEFLON® ZONYL® MP 1000 nanoparticles are 200-300 nm in diameter and were added to the coatings to maintain surface roughness while decreasing water infiltration. TEFLON was used in preferred coatings with a 1:1:4:2, 2:1:4:2, or 4:2:4:2 (polyurethane:silica:TEFLON:(Wollastonite or CaCO₃)) solids mass ratio.

Results.

Figure 2A:
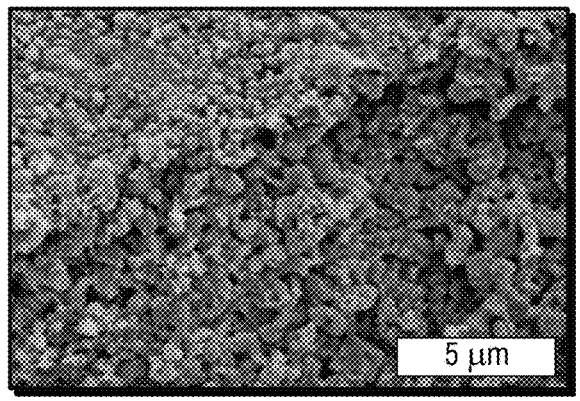
FIGS. 2A and 2B and 3A and 3B are coating micrographs taken by a scanning electron microscope (SEM).
Figure 2B:
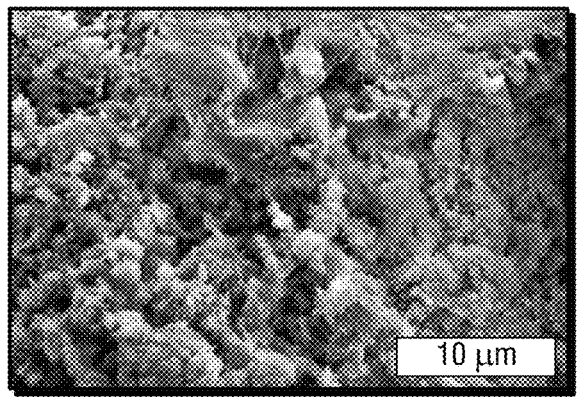

The freezing point delay for first observation of ice at −5° C. for coatings that contained 1:1:2:4 DESOTHANE polyurethane:silica:TEFLON:SUPER-PFLEX 100 CaCO₃ (solids mass ratio) dropped from over 100 seconds to less than 30 seconds after abrasion. Inspecting the coating with SEM (FIGS. 2A and 2B, top and cut away) showed a TEFLON and silica rich surface and the star shaped CaCO₃ present and no TEFLON detected subsurface. The top surface was rich in silica nanoparticles and TEFLON while the interior showed less of those fillers and more CaCO₃. This effect was not unique for CaCO₃ based coatings, but was also observed when Wollastonite was used. It was theorized that the deteriorated wetting resistance after abrasion was due to low amounts of TEFLON and silica present in the body of the coating due to insufficient mixing.

Figure 3A:
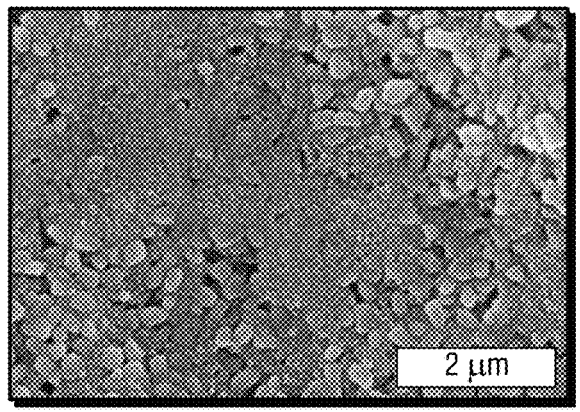
Figure 3B:
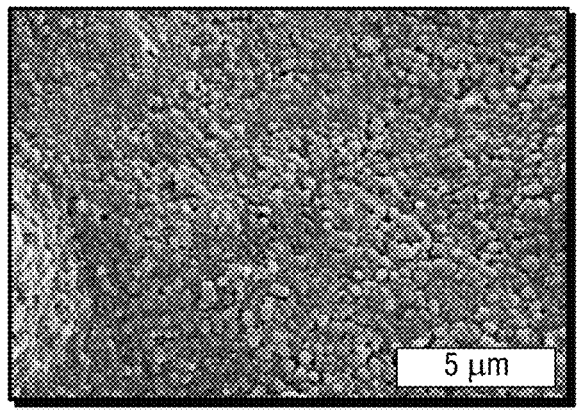

To increase the freezing delay after abrasion, the mixing of the formulations was increased to homogenize throughout the coating the distribution of fillers that affect icing. The fillers were first combined with solvent, jar milled for 3 to 12 hours to disperse them in the solvent, mixed with polyurethane coating material, and mixed in a Thinky centrifugal mixer. The end result was a more uniform top surface as shown in FIGS. 3A and 3B. Top SEM images of coatings without (FIG. 3A) and after (FIG. 3B) premixing of fillers in a jar mill followed by Thinky mixing of the formulation were produced. Increased mixing of the formulation resulted in more uniformly distributed TEFLON and silica at the surface as well as longer freezing delays.

The −5° C. freezing delay for first observation of ice from a 1:1:2:4 DESOTHANE polyurethane:silica:TEFLON:SUPER-PFLEX 100 CaCO₃ (solids mass ratio) coating increased to almost 300 seconds from 100 seconds as a result of more mixing. However, after abrasion, the freezing delay decreased to 30 seconds over three freezing cycles. Reduction in freezing delay after abrasion was also observed for coatings based on Wollastonite fillers. SEM showed there still were significantly reduced amounts of TEFLON and silica in the body of the coatings.

Figure 4:
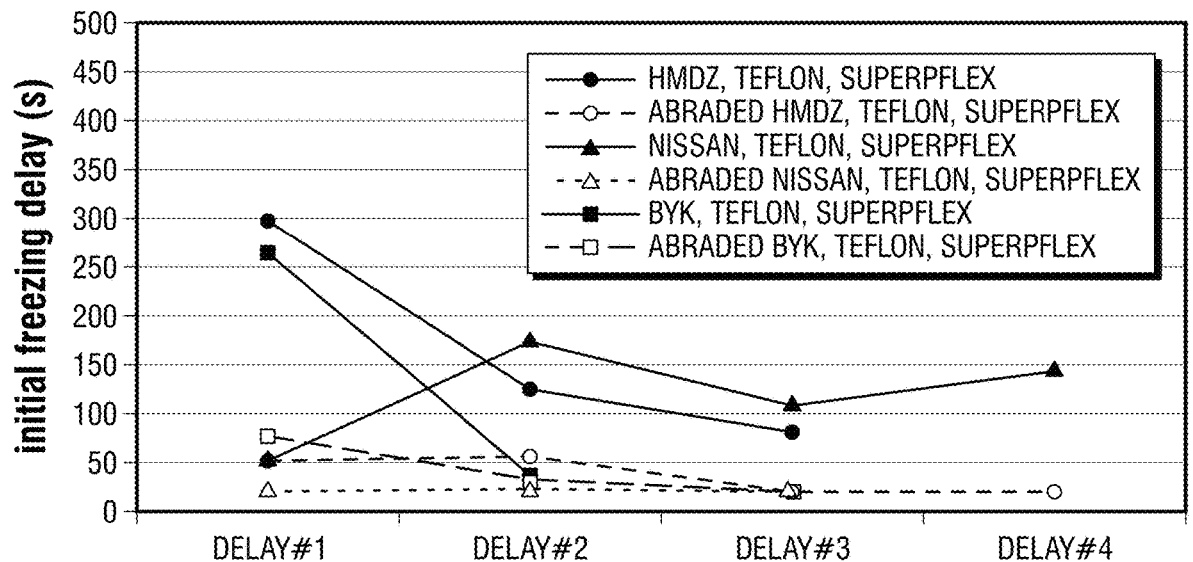
FIGS. 4-7 are charts of freezing delay for various evaluated coating samples.

Colloidal silicas pre-dispersed in solvents and available from BYK and Nissan Chemical for the solid HMDZ fumed silica were then substituted under the hypothesis that the already suspended colloidal silica would disperse better in the formulations. The result of severely decreased freezing delays after abrasion regardless of silica type was observed. FIG. 4 shows −5° C. freezing delays for initial observation of ice from multiple freezing cycles for coatings containing different silica nanoparticles, TEFLON nanoparticles, and SUPER-PFLEX 100 CaCO₃ in a 1:1:2:4 DESOTHANE polyurethane:silica:TEFLON:SUPER-PFLEX 100 CaCO₃ solids weight ratio. The type of silica is shown in the legend. The coatings showed a significant decrease in freezing delay after abrasion.

Because SEM showed a low level of TEFLON inside the coatings, the proportion of TEFLON in the coating was increased to a 1:1:4:2 polyurethane: silica: TEFLON: (CaCO₃ or Wollastonite) solids weight ratio. This resulted in increased freezing delay post-abrasion results. Higher TEFLON mass fraction formulations are described in Table 1 along with their performance results, such as, contact angle, contact angle hysteresis, freezing delay pre- and post-abrasion, the change in freezing delay after multiple cycles, and the hardness of the coating from a Gardco/Wolff Wilborn Pencil Test.

Figure 7:
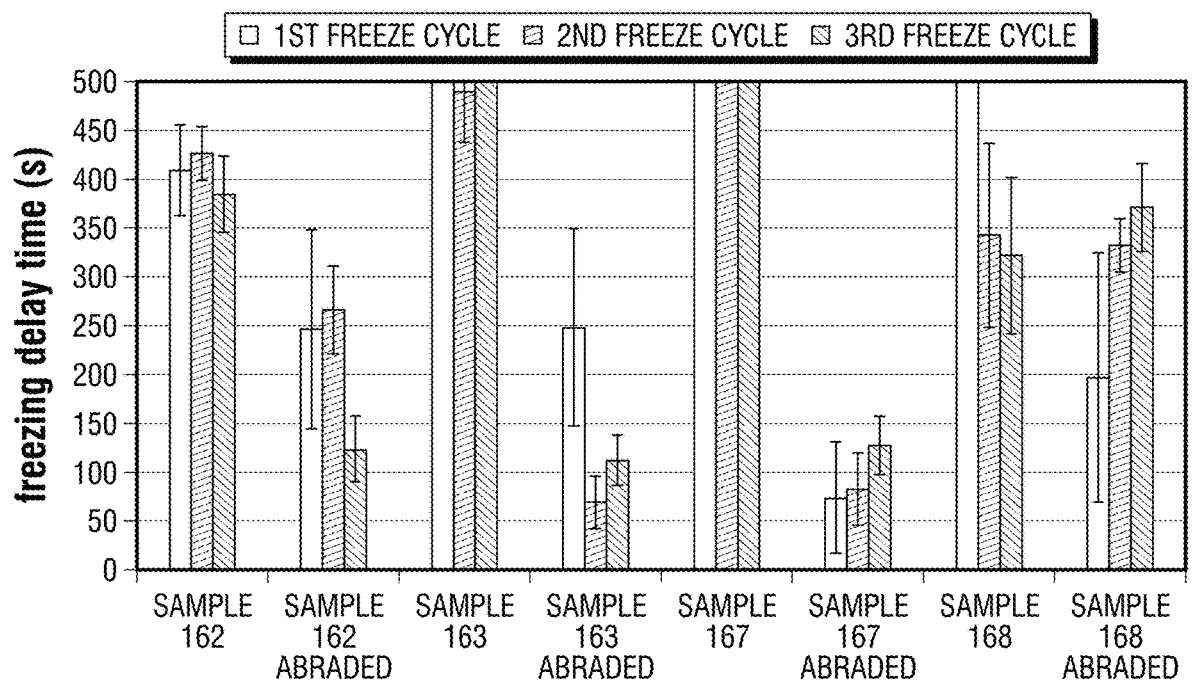

Samples 162, 163, 167, and 168 were prepared with a greater mass fraction of polymer (4 polymer:2 silica:4 TEFLON:2 CaSiO₃ mass ratio) and evaluated. Performance results, including freezing delay pre- and post-abrasion, are shown in Table 1. FIG. 7 shows freezing point delay through three freeze cycles for both pre- and post-abraded samples.

Sample 162 pore volume, measured using mercury porosimetry, was 12.6 vol % using pores less than 9,000 nm. Using pores less than 32,000 nm yielded a pore volume of 20.3 vol %, which could be considered a maximum possible porosity. The sample was prepared by spraying the coating onto glass, scraping the coating off the glass, and then analyzing the scraped-off coating. As the pore size cutoff increases, spacing between portions of the scraped-off coating might be included in the measured value. Accordingly, actual porosity of the coating itself may be lower.

As a comparison to sample 162, sample 212 was prepared with identical composition except that TEFLON was replaced with additional CaSiO₃ of equal mass. That is, it contained 4:2:0:6 solids mass ratio of DESOTHANE polyurethane:hexamethyldisilazane SiO₂:TEFLON:Wollastonite 1250WC. Sample 212 pore volume, measured using mercury porosimetry, was 7.7 vol % using pores less than 9,000 nm. Using pores less than 32,000 nm yielded a pore volume of 13.2 vol %, which could be considered a maximum possible porosity. The porosity determination sample was prepared by spraying the coating onto glass, scraping the coating off the glass, and then analyzing the scraped-off coating. As the pore size cutoff increases, spacing between portions of the scraped-off coating might be included in the measured value. Accordingly, actual porosity of the coating itself may be lower.

Despite the lower porosity, pre-abrasion freeze delay testing on sample 212 showed much shorter delays until ice formation on the second and third freezing cycles. This result suggested that water infiltrated into the coating, changed the polarity, and accelerated ice nucleation relative to the starting dry coating. By comparison, sample 162, which contained TEFLON maintained the freezing delays over three cycles. Sample 162 had freezing delays at −5° C. of (1st, 2nd, 3rd freezing cycle): 401+/−46 sec, 427+/−28 sec, 383+/−39 sec. Sample 212 had freezing delays at −5° C. of (1st, 2nd, 3rd freezing cycle): 363+/−84 sec, 48+/−9 sec, 86+/−3 sec.

Notably, the sample with higher porosity (162) nonetheless displayed evidence of reduced water infiltration compared to the sample with lower porosity (212). Without being limited to any particular theory, TEFLON being more hydrophobic than the silica and Wollastonite was believed to be the cause. If TEFLON lines the pores of sample 162, capillary pressure may be greater against infiltration and less water may seep in compared to sample 212. Even if there are more pores or a greater pore volume, water could have a greater capillary pressure to overcome to enter the TEFLON lined pores. Capillary pressure pulls water into pores lined with hydrophilic materials and pushes water out of pores lined with hydrophobic materials. Consequently, TEFLON particles exposed within pores may reduce water infiltration into pores.

In the formula column of Table 1 PPG is DESOTHANE HS CA8800/6900 polyurethane clear coat, AN is Akzo Nobel ECLIPSE G-7 polyurethane clear coat, S100 is SUPER-PFLEX 100 CaCO$_3$ (calcium carbonate), S200 is SUPER-PFLEX 200 CaCO$_3$, WC is Wollastonite 1250WC, AS is Wollastonite 1250AS, 1250 is Wollastonite 1250, A3000 is Wollastonite Aspect 3000 WC20804, HMDZ silica is Hexamethyldisilazane SiO$_2$, and BYK is BYK LP-X21261 hydrophobic colloidal silica. For purposes of comparison, a topcoat sample has an initial freezing delay at −5° C. of ~30 seconds before abrasion and ~10 seconds after abrasion. "Pins" indicates failure of a 50 μL water droplet to roll as the surface was tilted to 90°. Some coatings have missing measurements because they were not suitable for further evaluation based on initial results.

TABLE 1

| Formula & mass ratio | Sample number | Contact angle (deg) | Contact angle hysteresis (deg) | Roll off angle (deg) | −5° C. freezing delay (s) | % delay retained after cycling (#cycles) | Abraded −5° C. freezing delay (s) | Abraded % delay retained after cycling (#cycles) | Hardness |
|---|---|---|---|---|---|---|---|---|---|
| 1:1:4:2 PPG:HMDZ SiO$_2$: TEFLON:S100 | 118 | 124 | | pins | 243 ± 247 | 16% (2) | | | |
| 1:1:4:2 PPG:HMDZ SiO$_2$: TEFLON:WC | 119 | 120° | 14° | pins | 396 ± 105 | 43% (3) | 80 ± 49 | 61% (2) | 5B |
| 1:1:4:2 AN:HMDZ SiO$_2$: TEFLON:WC | 123 | 145° | 23° | 15° | 160 ± 74 | 96% (3) | 30 ± 6 | 136% (3) | 2B |
| 1:1:4:2 AN:HMDZ SiO$_2$: TEFLON:S100 | 126 | 133° | 10° | pins | 407 ± 211 | 44% (3) | 75 ± 30 | 138% (3) | F |
| 1:1:4:2 PPG:HMDZ SiO$_2$: TEFLON:1250 | 129 | 133° | 9° | 40° | 266 ± 31 | 13% (3) | | | <9B |
| 1:1:4:2 PPG:HMDZ SiO$_2$: TEFLON:AS | 130 | 142° | 13° | 30° | 171 ± 113 | 40% (3) | 92 ± 104 | 100% (3) | F |
| 1:1:4:2 AN:HMDZ SiO$_2$: TEFLON:1250 | 134 | 150° | 10° | 5° | 45 ± 22 | 73% (2) | | | <9B |
| 1:1:4:2 PPG:HMDZ SiO$_2$: TEFLON:S200 | 135 | 149° | 5° | 5° | 283 ± 133 | 17% (3) | | | 2B |
| 1:1:4:2 AN:HMDZ SiO$_2$: TEFLON:AS | 137 | 140° | 7° | 30° | 391 ± 84 | 26% (3) | 48 ± 37 | 82% (3) | F |
| 2:1:4:2 PPG:HMDZ SiO$_2$: TEFLON:WC | 139 | 150° | 7° | 10° | 229 ± 79 | 56% (3) | 78 ± 37 | 73% (3) | 1H |
| 2:1:4:2 AN:HMDZ SiO$_2$: TEFLON:WC | 140 | 110° | 5° | pins | 304 ± 22 | 25% (3) | 195 ± 89 | 55% (3) | 1H |
| 4:2:4:2 PPG:HMDZ SiO$_2$: TEFLON:WC | 162 | 104° | 4 | pins | 410 ± 46 | 94% (3) | 246 ± 102 | 50% (3) | 4H |
| 4:2:4:2 PPG:BYK SiO$_2$: TEFLON:WC | 163 | 95° | 10 | pins | >500 | 100% (3) | 249 ± 101 | 45% (3) | 4H |
| 4:2:4:2 PPG:HMDZ SiO$_2$: TEFLON:A3000 | 167 | 140° | 5° | 5° | >500 | 100% (3) | 74 ± 56 | 174% (3) | 4H |
| 4:2:4:2 PPG:BYK SiO$_2$: TEFLON:A3000 | 168 | 100° | 4° | 60° | >500 | 63% (3) | 197 ± 127 | 188% (3) | 4H |

Conclusions.

The freezing delay of water on coatings made from DESOTHANE mixed with $CaCO_3$ degraded significantly over multiple cycles.

Coatings containing Wollastonite 1250 did not maintain sufficient freezing delays for water with multiple freezing cycles. This was probably due to the hydrophilic surface.

ECLIPSE polyurethane mixed with HMDZ silica, TEFLON, and SUPER-PFLEX $CaCO_3$ showed moderately increased contact angles, increased maintenance of freezing delays pre- and post-abrasion, and increased hardness compared to coatings with the same mass ratio and silica type containing Wollastonite 1250WC. Sample 126 had a higher hardness rating compared to 135 and was used for testing shown in FIG. 5.

Samples containing a 2:1:4:2 polyurethane:silica:TEFLON:Wollastonite 1250WC solids mass ratio had increased hardness as well as ice nucleation inhibition pre- and post-abrasion after multiple cycles compared to coatings with less polymer, i.e. 1:1:4:2 mass ratio coatings. Sample 139 had an increased contact angle. Both samples 139 and 140 were used for testing shown in FIG. 5.

Samples containing a 1:1:4:2 polyurethane:silica:TEFLON:Wollastonite 1250WC solids mass ratio had insufficient hardness ratings. The additional polymer in samples 139 and 140 probably increased the cohesiveness of the coating and resulted in higher hardness.

Samples containing a 4:2:4:2 polyurethane:silica:TEFLON:Wollastonite 1250WC or A3000 increased the mass fraction of polymer in the coatings compared to coatings with less polymer, i.e. 1:1:4:2 or 2:1:4:2. The greater amount of polymer was shown to increase damage tolerance. Also, ice nucleation inhibition increased for pre- and post-abrasion after multiple cycles.

Samples based on Wollastonite 1250AS had increased hardness, contact angles, and freezing delays compared to coatings with the same mass ratio and silica type that contain Wollastonite 1250WC. Sample 130 was used for testing shown in FIG. 5 because it was one of the two better samples based on DESOTHANE.

Figure 5:
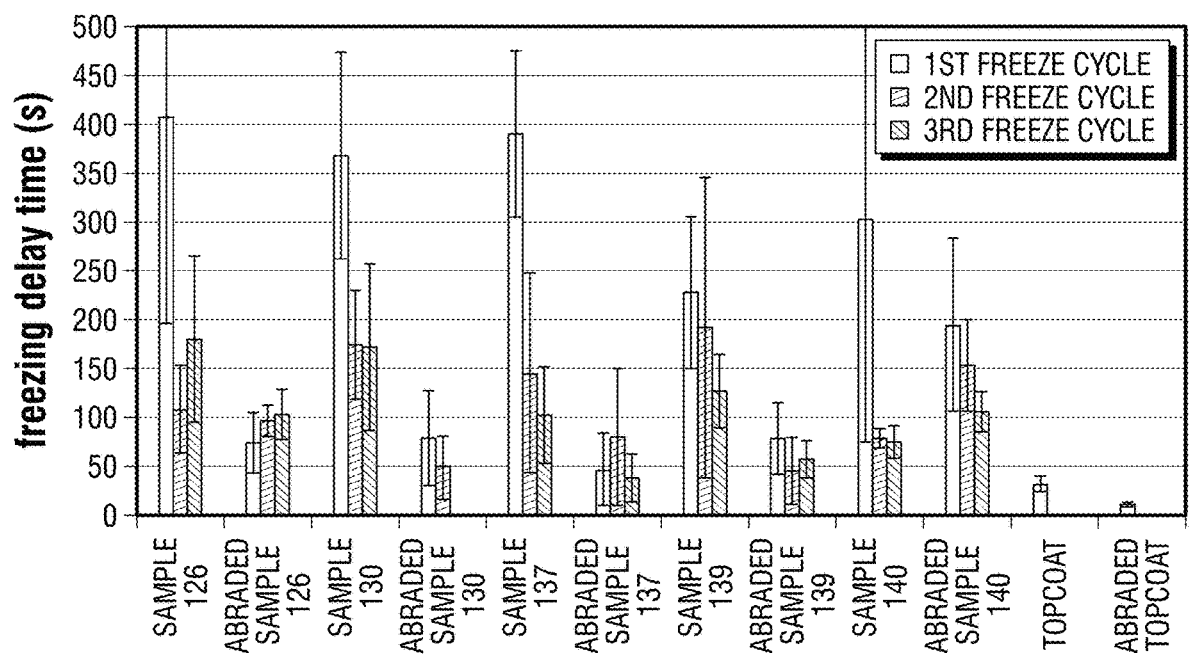

The pre- and post-abrasion −5° C. freezing delays to the time for first observation of 3 to 5 droplets of ice for three freezing cycles are shown in FIG. 5 for samples 126, 130, 137, 139, and 140. The samples performed better than pre- and post-abraded aircraft white topcoat (PPG DESOTHANE HS CA8000 BAC 70846 white).

Figure 6:
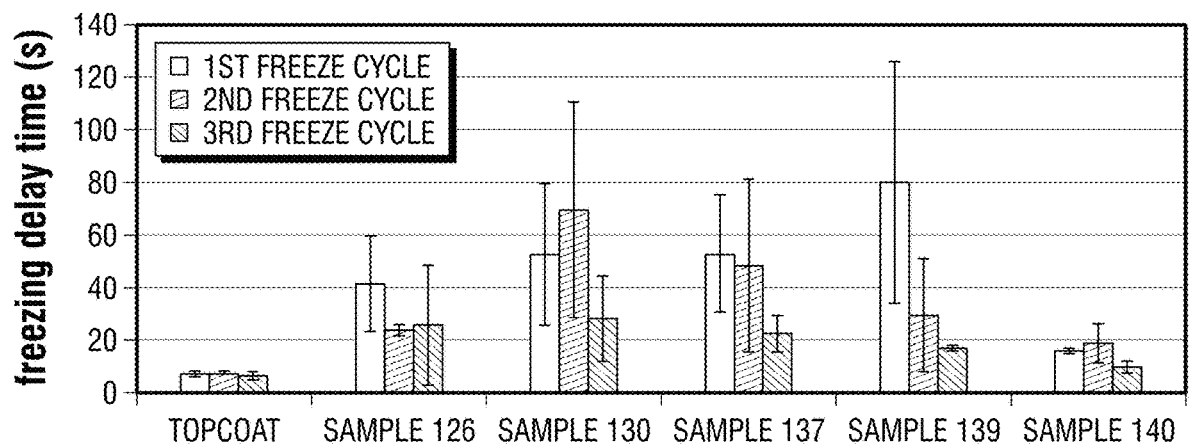

The time to initial observation of ice was measured at −10° C. for samples 126, 130, 137, 139, and 140 as shown in FIG. 6. The samples went through three freezing cycles as indicated by the legend on the graph. The samples performed better than an identical aluminum panel painted with aircraft white topcoat (PPG DESOTHANE HS CA8000 BAC 70846 white).

FIG. 7 shows time until initial observation of ice at −5° C. for the higher polymer mass fraction samples of Table 1. The samples went through three freezing cycles as indicated by the legend on the graph. The times until freezing for the as-made and abraded samples with a 4:2:4:2 solids mass ratio were significantly longer than the times for lower polymer content samples in FIG. 5. Furthermore, the hardness of the higher polymer mass fraction samples was greater than the lower polymer mass fraction samples, which may result in a more durable coating.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

What is claimed is:

1. A method comprising:
applying a coating composition comprising first, second, and third particles, in one application step, the coating composition containing first particles, second particles, and third particles in a base containing a polymer, the second particles having a composition different from the third particles and first particles, and the third particles having a composition different from the first particles; and
curing the applied coating composition, forming a cross-linked, continuous polymer matrix wherein each of the first, second, and third particles are substantially homogenously distributed throughout a thickness of the polymer matrix, and forming a layer of a cured coating, the cured layer exhibiting a cured porosity of from at least 5 vol % to at most 25 vol % substantially homogenously distributed throughout the thickness of the polymer matrix, wherein an outer surface of the cured layer includes surfaces of at least first particles extending outward from a top periphery of the polymer matrix, the outer surface exhibiting a water contact angle greater than 90° and exhibiting a property of delaying ice formation compared to an identical cured layer without the first particles.

2. The method of claim 1 wherein the cured layer is formed over an exterior surface of an aircraft.

3. The method of claim 2 wherein the second particles comprise a fluoropolymer, the polymer matrix is substantially fluorine-free, and the method further comprises forming a plurality of the layers of the cured coating by repeating the application of the coating composition over the exterior surface and curing the repeatedly applied coating composition.

4. The method of claim 3 wherein the first particles comprise $SiO_2$, the fluoropolymer comprises polytetrafluoroethylene, and the third particles comprise $CaSiO_3$.

5. The method of claim 3 wherein the polymer matrix comprises polyurethane.

6. The method of claim 1 wherein the third particles exhibit a particle size range for their largest dimension of greater than about 500 nm to about 20,000 nm, the second particles exhibit a particle size range of from about 100 nm to about 500 nm, the first particles exhibit a particle size range of from about 5 nm to about 50 nm, and the outer surface exhibits a surface roughness on a length scale of from about 100 nm to about 5,000 nm.

7. The method of claim 1 wherein the applying comprises spray applying.

8. The method of claim 1 wherein the polymer matrix exhibits a water contact angle less than 90°, the outer surface further comprises surfaces of polymer matrix, and the second particles exhibit a property of reducing water infiltration compared to an equal mass of the first particles, third particles, or a combination thereof.

9. The method of claim 1 further comprising eroding the outer surface and forming another outer surface, the other outer surface exhibiting a water contact angle greater than 90° and a property of delaying ice formation compared to an identical cured layer without the first particles.

10. The method of claim 1 wherein the polymer matrix is substantially fluorine-free.

11. The method of claim 1 wherein the third particles exhibit particle sizes greater than the second particles, which exhibit particle sizes greater than the first particles, the cured layer exhibits a mass ratio of 1st:2nd:3rd, wherein "1st," "2nd," and "3rd" are the respective proportions of first, second, and third particles, 2nd being greater than both 1st and 3rd, and the third particles exhibit aspect ratios of at least about 1.5:1.

12. The method of claim 11 wherein the third particles exhibit a particle size range for their largest dimension of greater than about 250 nm, the second particles exhibit a particle size range of from about 100 nm to about 10,000 nm, and the first particles exhibit a particle size range of less than about 100 nm.

13. The method of claim 1 wherein the outer surface further comprises surfaces of second particles extending outward from the top periphery of the polymer matrix, the polymer matrix exhibits a water contact angle less than 90°, and the outer surface further comprises polymer matrix.

14. The method of claim 1 wherein the second particles exhibit a property of reducing water infiltration compared to an equal mass of the first particles, third particles, or a combination thereof.

15. The method of claim 1 wherein the outer surface exhibits a surface roughness on a length scale of from about 100 nm to about 5,000 nm.

16. The method of claim 1, wherein the first particles reduce flocculation of the second particles and stabilize dispersion of the second particles.

17. The method of claim 1, wherein the third particles stabilize dispersion of the second particles compared to an identical coating composition without the third particles.

18. The method of claim 1, wherein the first particles are hydrophobic, containing a material selected from the group consisting of silica, carbon, fluoropolymers, alumina, ceria, zirconia, titania, zinc oxide, and combinations thereof.

19. The method of claim 1, wherein the third particles contain a material selected from the group consisting of calcium silicate, calcium carbonate, iron oxides, and combinations thereof.

20. The method of claim 1 wherein:
the second particles contain polytetrafluoroethylene and exhibit a particle size range of from about 100 nm to about 500 nm;
the first particles are hydrophobic, containing a material selected from the group consisting of silica, carbon, fluoropolymers, alumina, ceria, zirconia, titania, zinc oxide, and combinations thereof, exhibiting a particle size range of less than about 100 nm, reducing flocculation of the second particles, and stabilizing dispersion of the second particles; and
the third particles contain a material selected from the group consisting of calcium silicate, calcium carbonate, iron oxides, and combinations thereof, exhibiting a particle size range for their largest dimension of greater than about 500 nm, and further stabilizing dispersion of the second particles compared to an identical coating composition without the third particles.

* * * * *